Feb. 28, 1950 S. H. TOWNER 2,498,726
DIFFERENTIAL GALVANOMETER MOVEMENT

Filed Nov. 23, 1945 2 Sheets-Sheet 1

Inventor
STANLEY HERBERT TOWNER by
*E. D. Phinney*
Attorney

Patented Feb. 28, 1950

2,498,726

UNITED STATES PATENT OFFICE 2,498,726

DIFFERENTIAL GALVANOMETER MOVEMENT

Stanley Herbert Towner, London, England, assignor, by mesne assignments, to International Standard Electric Corporation, New York, N. Y., a corporation of Delaware Application November 23, 1945, Serial No. 630,426
In Great Britain November 5, 1943

Section 1, Public Law 690, August 8, 1946
Patent expires November 5, 1963

8 Claims. (Cl. 171—95)

This invention relates to an electrically operated device for indicating angular positions. Such a device is useful in remote control or indicating systems for the purpose of providing a rotary displacement at the far end of a line in response to and indicative of some condition at the sending end, say a similar rotary displacement or a circuit condition that can be indicated by such displacement. Thus a variable condenser may be located at the distant end and its moving vanes may be set by manipulation of a control knob at the sending end: or again, a meter at the remote end may have its pointer set by adjustable resistances at the sending end.

The device in accordance with the invention may consist of a continuous ring of magnetisable material, a magnet located within said ring and angularly positionable in accordance with the magnetic condition of said ring, and electromagnetic means for inducing magnet poles in said ring to determine the angular position of said magnet.

Or again, the device in accordance with the invention may consist of a continuous ring of magnetisable material, an indicating member centrally pivoted within said ring and having a magnetic pole adjacent said ring, and electromagnetic means for variously inducing magnetic poles in said ring to determine the angular position of said indicating member.

Or finally, if not as stated in either of the last two paragraphs, the device in accordance with the invention will consist of a circularly arcuate strip of magnetisable material, an indicating member centrally-pivoted with respect to said arc and having a magnetic pole adjacent to said strip, and electromagnetic means for inducing at fixed positions in said ring magnetic poles of strengths that are variable to control the angular setting of the indicating member.

A description will be given of the accompanying drawings in which.

Figure 1:
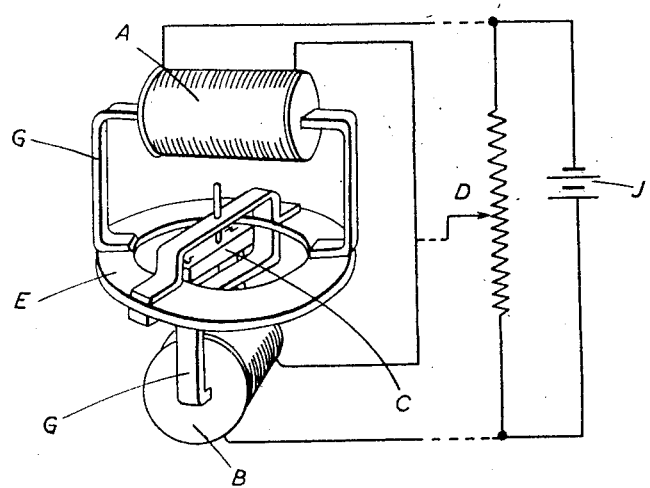
Fig. 1 is a somewhat diagrammatic perspective view of one embodiment of the invention.
Figure 2:
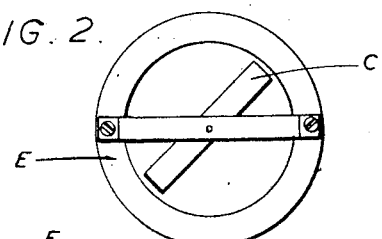
Fig. 2 is a top plan view.
Figure 3:
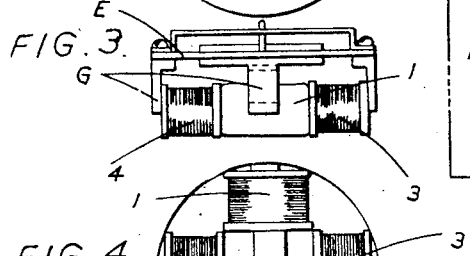
Fig. 3 is a side view.
Figure 4:
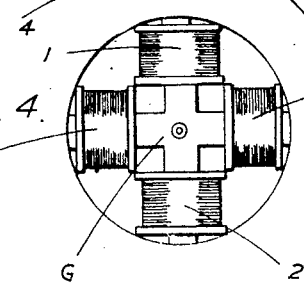
Fig. 4 is a bottom plan view.
Figure 5:
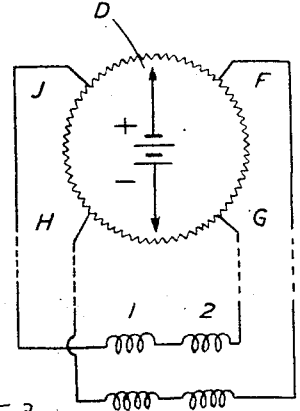
Fig. 5 is a circuit diagram of a second embodiment of the invention.

In Fig. 1, the potentiometer D at the righthand side of the drawing is to be understood as located at the sending end of a three-wire line, and the device shown on the left as located at the distant end and serving there to give an indication of the setting of the potentiometer slide by a displacement of its moving element through any angle up to 90°. The device consists of a continuous or unbroken circular ring E of magnetisable material, an electromagnetic means A, B, G for inducing magnet poles in said ring E, and a bar magnet C mounted diametrically on a central pivot within said ring E so as to be angularly positionable to give the required indication. The electromagnetic pole-inducing means consists of upper and lower coils A and B mounted upon cores G of magnetisable material and extending pole-pieces which are attached to or at least in close magnetic association with the circular ring E at four diametrically opposite and quadrantal positions thereon. The coil A is permanently connected via the line between one end of the potentiometer and the slider, while the coil B is similarly connected to the slider and the other end of the potentiometer; thus a full sweep of the slider from top to bottom will change the state of the coils from that in which B is fully energised and A is dead to that in which A is fully energised and B is dead. The indicator magnet C will mark this swing, starting from what may be called the N-S position, ending in the E-W position, and making a smooth and proportionate turn in between. Its position at any potentiometer setting is along that diameter where it has minimum reluctance in the magnetic circuit; and, depending on the relative intensity of energisation of the two coils A and B, it assumes a position corresponding to that of the slides of the potentiometer.

Figures 2 to 5 show an alternative design in which the windings are divided and are assembled as four coils 1, 2, 3, 4 on a cruciform core G, those two coils on opposite limbs being connected in series with one another. At the sending end there is a "circular" potentiometer D comprising a continuous resistance element and a pair of diametrically opposed sliders between which the battery is connected. Tappings are taken from four equally spaced points F, G, H, J around the resistance and lead over a four-wire line to the distant end where the diametrically opposite points F and H are connected to the ends of one pair of coils 3, 4, and the other two points G and J are connected to the ends of the other pair 1, 2. In this embodiment the rotary movement of the pivoted bar magnet C is unlimited and provides an accurate indication of the positioning of the slider-pair at the sending end. A similar arrangement with a three-limbed core is also possible.

In either embodiment it may be desirable to damp the movement so that oscillation of the magnet about its final position may be reduced: this may be accomplished by inserting a copper ring between the magnet C and the surrounding ring E.

It will be appreciated that the design of such a device as that shown and described needs some further consideration than has been given to it above, inasmuch as there are limits in both directions to the reluctance that can be permitted to the ring E. Thus if the ring E were omitted from the design, that is to say the reluctance were made very great, then the movement of the magnet C would not be a smooth one as above stated, but would be a sudden jump from the N-S direction to the E-W direction without any intermediate stability: on the other hand if the thickness of the ring were so large and its material so ideal that the reluctance was very small, then even a quite substantial magnetic flux would fail to operate the device because it would take the easy circumferential path instead of the diametral path that influences the pivotal magnet.

Figure 6:
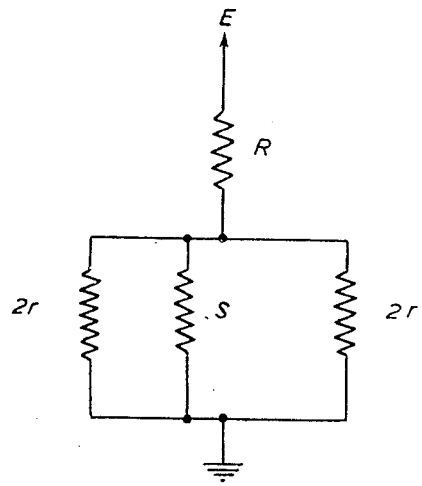
Figs. 6 and 7 are electrical circuit analogues of the magnetic circuits.
Figure 7:
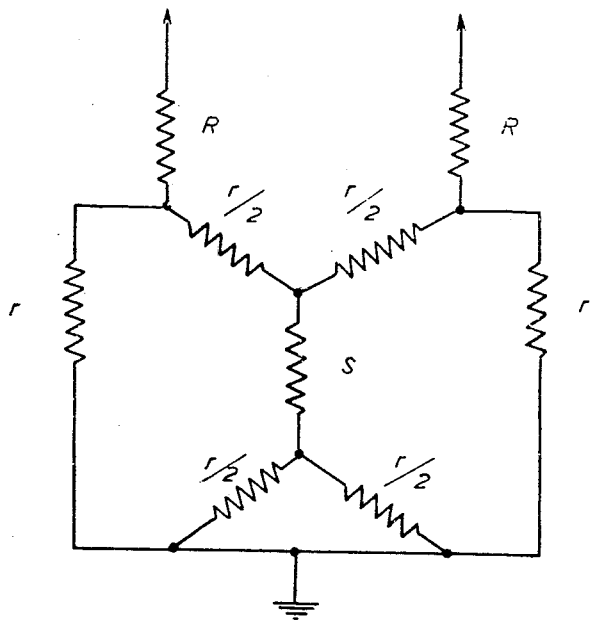

Such considerations of design are aided by the magnetic circuit diagrams, Figs. 6 and 7, which relate to the second embodiment, and which make use, by a known analogy, of electrical circuit symbolism. Fig. 6 shows the condition when the coils on one axis only are energised; and Fig. 7 shows the condition of equal energization along both axes.

E is the total M. M. F. resulting from energisation of the coils;

R is the reluctance of the magnetic path outside the ring;

$r$ is the reulctance of a quadrant (¼ circumference) of the ring; and

S is the diametrical reluctance through the bar magnet and air gaps.

Then the "current" in S in each case is given by:

Fig. 6.

$$\frac{E.r}{R.r + R.S + r.S}$$

Fig. 7.

$$\frac{E.r}{2R.r + 2R.S + 2r.S + r}$$

For maximum efficiency, the values of reluctance corresponding to the resistances P, S and $r$ should be chosen so that the ratio of the power dissipated in S relative to that in the complete circuit is a maximum.

In Fig. 6, this condition is only satisfied when $R=0$ and $r=\infty$, the ratio then being unity.

In Figure 7, it applies when $R=0$ and $r=\sqrt{2}.S$ and the ratio of power in S to total power is then $$\frac{1}{5.82}$$

As this is the more onerous condition it would be reasonable to use this ratio in all cases; the power ratio for the condition covered by Fig. 6 then becomes $$\frac{\sqrt{2}}{\sqrt{2}+1} = \frac{1}{1.7}$$

Reverting to consideration of the magnetic circuit it is desirable that the reluctance of the magnetic paths external to the ring i. e. the cores within the energising windings, should be as low as possible, these parts being represented by R in the corresponding electrical circuit. Further, the reluctance of the magnet should be approximately equal to that of the associated air gaps and the total reluctance of the magnetic ring should be approximately 5.6 times $(4 \times \sqrt{2})$ that of the magnet, plus the air gaps. These conditions will ensure maximum sensitivity of the magnetic system but satisfactory operation is still obtainable when the characteristics of the magnetic circuit depart considerably from the optimum relationship.

A sample having the following dimensions has been tested:

Length of magnet, 1 inch (cobalt steel).
Cross section, .25×.25 inch.
Cross section of ring, .187×.062 inch.
Cross section of core, .375×.062 inch.

The power required to provide a torque of 1 cm. grm. on the spindle was found to vary between 20 and 100 milliwatts according to the degree of unbalance between the energising current in the opposing windings. This torque may be regarded as sufficient to operate a light indicating mechanism and could be increased to perform remote control function by increasing the available electrical power.

What is claimed is:

1. An electrically-operated device for indicating angular positions comprising a circularly arcuate strip of magnetisable material, an indicating member centrally pivoted with respect to said arc and having a magnetic pole adjacent to said strip, and electromagnetic means in axially spaced relation to said pivoted member for inducing at fixed positions in said strip magnetic poles of strengths that are variable to control the angular setting of the indicating member.

2. An electrically operated device for indicating angular positions, comprising a continuous ring of magnetizable material, a magnet located within said ring, said magnet having its poles closely adjacent said ring to minimize the reluctance of its magnetic circuit, and electromagnetic means for inducing poles in said ring to determine the angular position of said magnet, said electromagnetic means consisting of magnetic circuits in which there are two diametral cores and one solenoid on each core.

3. An electrically operated device for indicating angular positions, comprising a continuous ring of magnetizable material, a magnet located within said ring, said magnet having its poles closely adjacent said ring to minimize the reluctance of its magnetic circuits, and electromagnetic means for inducing poles in said ring to determine the angular position of said magnet, said electromagnetic means consisting of magnetic circuits in which there is a single core of cruciform shape with one solenoid on each of the four limbs.

4. In an electrically operated follow-up device, in combination, a magnetizable ring, a bar magnet rotatable about the axis of said ring and in coplanar relation thereto, electromagnetic means for causing rotation of said magnet, said electromagnetic means comprising a first core extending parallel to a diameter of said ring in axially spaced relation thereto, a second core extending parallel to another diameter of said ring in axially spaced relation thereto, electromagnetic coil means on each of said cores, and circuit means for selectively energizing said coil means to induce an electromagnetic field of a selected directivity in the area enclosed by said ring.

5. The combination according to claim 4 wherein said first and second cores extend on opposite sides of said ring, respectively.

6. The combination according to claim 5 wherein said cores enclose an angle of 90 degrees with each other.

7. The combination according to claim 4 wherein said cores extend in substantially the same plane parallel to the plane of said ring.

8. The combination according to claim 7 wherein said cores enclose an angle of 90 degrees with each other.

STANLEY HERBERT TOWNER.

REFERENCES CITED

The following references are of record in the file of this patent:

UNITED STATES PATENTS

| Number | Name | Date |
| --- | --- | --- |
| 1,695,264 | Adams | Dec. 18, 1928 |
| 2,057,845 | Pattee | Oct. 20, 1936 |
| 2,248,616 | Faus | July 8, 1941 |
| 2,294,741 | Fisk et al. | Sept. 1, 1942 |
| 2,333,406 | Ballard | Nov. 2, 1943 |
| 2,345,011 | Sias | Mar. 28, 1944 |
| 2,358,910 | DeGiers | Sept. 26, 1944 |